(12) United States Patent
Suwa et al.

(10) Patent No.: US 7,494,727 B2
(45) Date of Patent: *Feb. 24, 2009

(54) MAGNETIC RECORDING MEDIUM AND MAGNETIC RECORDING AND REPRODUCING APPARATUS

(75) Inventors: Takahiro Suwa, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 417 days.

This patent is subject to a terminal disclaimer.

(21) Appl. No.: 11/187,912

(22) Filed: Jul. 25, 2005

(65) Prior Publication Data

US 2006/0029834 A1 Feb. 9, 2006

(30) Foreign Application Priority Data

Aug. 3, 2004 (JP) .............................. 2004-227191

(51) Int. Cl.
  *G11B 5/66* (2006.01)
  *G11B 5/71* (2006.01)
  *G11B 15/48* (2006.01)
(52) U.S. Cl. .................. 428/832.2; 428/833.3; 360/135
(58) Field of Classification Search ................. 428/826, 428/836, 836.1, 848.5, 156; 427/548, 130; 216/22; 360/135
See application file for complete search history.

(56) References Cited

U.S. PATENT DOCUMENTS

| 4,935,278 | A | | 6/1990 | Krounbi et al. | |
|---|---|---|---|---|---|
| 5,766,718 | A | * | 6/1998 | Matsuda et al. | 428/848.5 |
| 6,014,296 | A | * | 1/2000 | Ichihara et al. | 360/135 |
| 6,495,240 | B1 | * | 12/2002 | Wada et al. | 428/156 |
| 6,583,957 | B1 | | 6/2003 | Takeshita et al. | |
| 6,586,044 | B1 | | 7/2003 | Takeshita et al. | |
| 2004/0038077 | A1 | * | 2/2004 | Nagao et al. | 428/836 |
| 2004/0166372 | A1 | * | 8/2004 | Haginoya et al. | 428/694 T |
| 2005/0186356 | A1 | * | 8/2005 | Hattori et al. | 427/548 |
| 2005/0191526 | A1 | * | 9/2005 | Fujita et al. | 428/848.5 |
| 2005/0199581 | A1 | * | 9/2005 | Suwa et al. | 216/22 |

FOREIGN PATENT DOCUMENTS

| JP | A 62-232720 | 10/1987 |
|---|---|---|
| JP | A 1-279421 | 11/1989 |
| JP | A 02-165416 | 6/1990 |
| JP | A 04-001922 | 1/1992 |
| JP | A 9-97419 | 4/1997 |

(Continued)

OTHER PUBLICATIONS

Translation JA 2003-109210.*

*Primary Examiner*—Carol Chaney
*Assistant Examiner*—Louis Falasco
(74) *Attorney, Agent, or Firm*—Oliff & Berridge, PLC (57) ABSTRACT

A magnetic recording medium in which a recording layer is formed in a predetermined concavo-convex pattern and recording and reproducing apparatus comprising the magnetic recording medium are disclosed. The magnetic recording medium has a high areal density and high reliability since the occurrence of a crash of a magnetic head is suppressed. The magnetic recording medium comprises a recording layer formed over a substrate in a predetermined concavo-convex pattern to form recording elements as a convex portion of the concavo-convex pattern and a non-magnetic filler element filled in a concave portion between the recording elements. In this configuration, the top surface of the filler element is formed in a shape partially recessed toward the substrate side to form a groove having a width smaller than the width of the concave portion on the surface of the magnetic recording medium.

11 Claims, 9 Drawing Sheets

FOREIGN PATENT DOCUMENTS

| | | |
|---|---|---|
| JP | A 2000-195042 | 7/2000 |
| JP | A 2002-515647 | 5/2002 |
| JP | A 2003-109210 | 4/2003 |
| WO | WO 99/59194 A1 | 11/1999 |

* cited by examiner

MAGNETIC RECORDING MEDIUM AND MAGNETIC RECORDING AND REPRODUCING APPARATUS

BACKGROUND OF THE INVENTION

1. Field of the Invention

The present invention relates to a magnetic recording medium in which a recording layer is formed in a predetermined concavo-convex pattern to form recording elements as a convex portion of the concavo-convex pattern, and to a magnetic recording and reproducing apparatus comprising the magnetic recording medium.

2. Description of the Related Art

Conventionally, in a magnetic recording medium such as a hard disk, the areal density has been significantly increasing through employing finer magnetic particles composing a recording layer, changing materials, and improving microprocessing of a head, and a further improvement of the areal density is expected from this time forward. However, problems such as limitations on head processing, erroneous recording to a track adjacent to a target track caused by a spread recording magnetic field of a magnetic head, and crosstalk upon reproducing have become apparent, and an improvement of the areal density is no longer possible by means of conventional techniques.

Therefore, as a candidate for a magnetic recording medium which may provide a higher areal density, a discrete track medium and a patterned medium having a recording layer formed in a concavo-convex pattern to form recording elements as a convex portion of the concavo-convex pattern have been proposed (see, for example, Japanese Patent Laid-Open Publication No. Hei 9-97419). As the areal density increases, the magnetic gap between a magnetic head and a magnetic recording medium becomes smaller. For a magnetic recording medium such as a discrete track medium or a patterned medium, in which an areal density of 200 Gbpsi or more is estimated, a magnetic gap of 15 nm or less may be required.

In a magnetic recording medium such as a hard disk, surface flatness is an important factor to prevent a magnetic head crash. For a discrete track medium and a patterned medium having a high areal density and a small magnetic gap, surface flatness is particularly important. In this respect, preferably, the concave portion between recording elements is filled with a non-magnetic filler element and the top surface of the recording element and the filler element are flattened. Examples of the method for filling concave portions with a filler element include a deposition method such as a sputtering method, a CVD (Chemical Vapor Deposition) method, or an IBD (Ion Beam Deposition) method. Examples of the flattening method include a processing method such as a CMP (Chemical Mechanical Polishing) method or a dry etching method (see, for example, Japanese Patent Laid-Open Publication No. Hei 12-195042 and Japanese National Publication of PCT Application No. Hei 14-515647).

On the other hand, when the surface is excessively flat, stiction of a magnetic head to the surface of a magnetic recording medium tends to occur, causing an increase in the occurrence of a magnetic head crash. In this respect, a magnetic head crash caused by stiction has been conventionally prevented by applying texture processing to the surface of a substrate and depositing a recording layer and other layers one after another thereon to form a fine concavo-convex structure on the surface of a magnetic recording medium following the texture processing pattern on the substrate. For a discrete track medium and a patterned medium, a configuration having a step between the top surface of a recording element and the top surface of a filler element has been disclosed (see, for example, Japanese Patent Laid-Open Publication No. Hei 1-279421). In this case, a technique utilizing the step for imparting a texture effect may be conceivable.

However, if the concavo-convex structure is formed on the surface by means of a technique for applying the texture processing to a substrate, the surface may become a wavy distorted shape having a period of about 100 nm to 2 μm. It would be difficult for a magnetic head to fly along the wavy distortion having a period of about 100 nm to 2 μm. And the wavy distortion may directly cause the variation of a magnetic gap. In the generation in which a magnetic gap was 25 nm or more, such a variation of the magnetic gap did not cause practical problems. However, if the magnetic gap is reduced to 15 nm or less, the effects caused by the variation of the magnetic gap may become practically inadmissible.

Also, even when the texture processing is applied to the surface of a substrate, the fine concavo-convex structure following the texture processing pattern on the substrate may be removed if the space between the recording elements is filled with the filler element and the top surfaces of the recording element and the filler element are flattened. Therefore, the formation of the desired fine concavo-convex structure on the surface is difficult by means of this technique.

In the case where a technique for forming a step between the top surface of the recording element and the top surface of the filler element is employed, the air film stiffness between a magnetic head and the surface of a magnetic recording medium becomes excessively small, causing the flying state of the magnetic head unstable. Therefore, the flying height of the magnetic head tends to be largely changed by disturbance, and sufficient reliability may not be obtained.

SUMMARY OF THE INVENTION

In view of the foregoing problems, various exemplary embodiments of this invention provide a magnetic recording medium in which a recording layer is formed in a predetermined concavo-convex pattern to form recording elements as a convex portion of the concavo-convex pattern and which has a high areal density and high reliability since the occurrence of a magnetic head crash is suppressed, as well as a magnetic recording and reproducing apparatus comprising the above magnetic recording medium.

The above object is achieved by various exemplary embodiments of the present invention by forming the top surface of a filler element in a shape partially recessed toward a substrate side to form, on the surface of the magnetic recording medium over the filler element, grooves having a width smaller than the width of a concave portion which is filled with the filler element.

During the course of completing the present invention, the present inventors first tried to prevent a magnetic head crash caused by stiction through forming non-magnetic protrusions on the surface. However, the recording and reproducing characteristics were deteriorated since a magnetic gap became larger by the size of the protrusion. The present inventors have made intensive investigations, and, as a result, have completed the present invention.

By forming the top surface of the filler element in a shape partially recessed toward the substrate side to form the grooves on the surface of the magnetic recording medium, a magnetic head crash caused by stiction can be prevented while the magnetic gap between the top surface of the recording element and the magnetic head is kept small. Since the width of the groove is smaller than the width of the concave portion which is filled with the filler element, sufficient air film stiffness between the magnetic head and the magnetic recording medium can be obtained to prevent the variation of the flying height of the magnetic head. In addition, the top surface of the filler element is formed in a shape partially recessed toward the substrate side to form the grooves, and thus the top surface of the recording element is not required to be processed to form the grooves. Therefore, excellent magnetic properties can be achieved.

Accordingly, various exemplary embodiments of the invention provide a a magnetic recording medium comprising:

a recording layer formed over a substrate in a predetermined concavo-convex pattern to form a recording element as a convex portion of the concavo-convex pattern; and a non-magnetic filler element filled in a concave portion formed between the recording elements, wherein a top surface of the filler element is formed in a shape partially recessed toward the substrate side to form a groove having a width smaller than the width of the concave portion on a surface.

In the present description, the "recording layer formed over a substrate in a predetermined concavo-convex pattern to form recording elements as a convex portion of the concavo-convex pattern" shall refer to a recording layer formed by dividing a continuous recording layer in a plurality of recording elements in a predetermined pattern. In addition, the above term shall also refer to a recording layer formed by partially dividing a continuous recording layer in a predetermined pattern to form recording elements partially interconnected to each other, to a recording layer continuously formed over a part of a substrate (for example, a recording layer having a spiral-like shape), and to a continuous recording layer on which both a convex portion and a concave portion are formed.

In the present description, the "top surface of a filler element" shall refer to the surface of the filler element opposite to the substrate side. The "top surface of a recording element" has a similar meaning as above.

Figure 18:
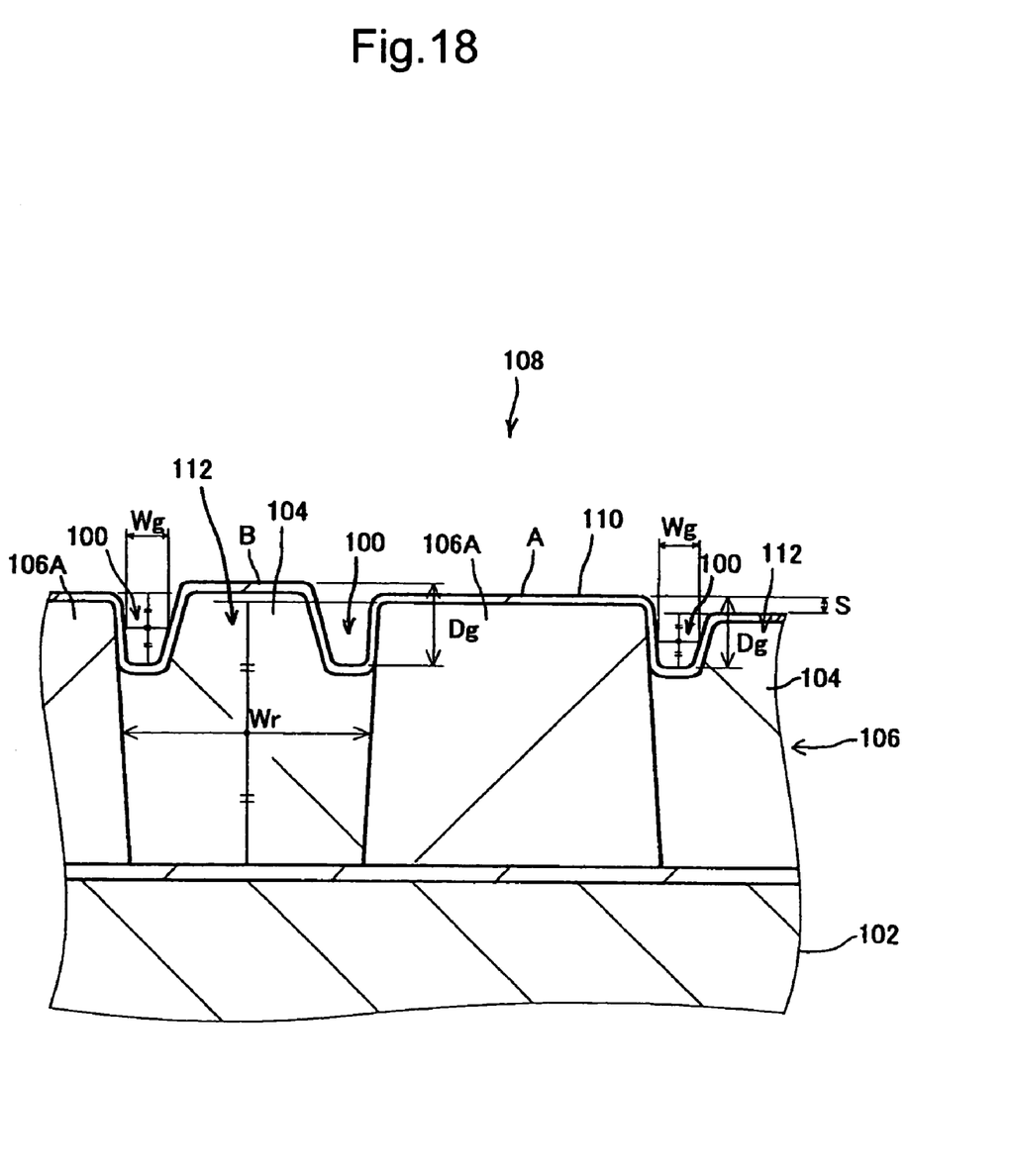
FIG. 18 is a sectional side view schematically showing the width of the groove, the width of the concave portion, the depth of the groove, the portion of the surface over the recording element, and the portion of the surface over the filler element defined in the present invention.

In the present description, the "width of a groove" shall refer to, for example, as shown by a symbol Wg in FIG. 18, a width at a position located at the midpoint of the length (in the thickness direction) measured from the lower portion (closer to a substrate 102) among the portion of the surface 110 of a magnetic recording medium 108 over a filler element 104 and the portion of the surface 110 over a recording element 106A adjacent to a groove 100 to the bottom of the groove 100.

In the present description, the "width of a concave portion" shall refer to, for example, as shown by a symbol Wr in FIG. 18, a width at the midpoint of the depth of a concave portion 112.

In the present description, the "depth of a groove" shall refer to, for example, as shown by a symbol Dg in FIG. 18, a length in the thickness direction from a higher portion (farther from the substrate 102) among the portion of the surface 110 of the magnetic recording medium 108 over the filler element 104 and the portion of the surface 110 over the recording element 106A adjacent to the groove 100 to the bottom of the groove 100. In FIG. 18, two cases (a case where the portion of the surface 110 over the recording element 106A is higher than the portion of the surface 110 over the filler element 104 and the other case where the portion of the surface 110 over the filler element 104 is higher than the portion of the surface 110 over the recording element 106A) are depicted in one drawing in order to explain the meaning of the term of "the depth of a groove."

In the present description, the "portion of the surface over a recording element" shall refer to, for example, as shown by a symbol A in FIG. 18, the highest portion (the farthest portion from the substrate 102) of a part of the surface 110, which is on the side of the recording element 106A opposite to the substrate 102, of the magnetic recording medium 108.

Similarly, the "portion of the surface over a filler element" shall refer to, for example, as shown by a symbol B in FIG. 18, the highest portion (the farthest portion from the substrate 102) of a part of the surface 110, which is on the side of the filler element 104 opposite to the substrate 102, of the magnetic recording medium 108.

In the present description, the "step height between the portion of the surface over a recording element and the portion of the surface over a filler element" shall refer to, for example, as shown by a symbol S in FIG. 18, a length in the thickness direction from the portion of the surface 110 of the magnetic recording medium 108 over the recording element 106A to the portion of the surface 110 over the filler element 104.

In the present description, the "magnetic recording medium" shall refer not only to a medium such as a hard disk, a floppy (registered trademark) disk, or a magnetic tape, which utilize only magnetism for recording and reading information, but also to a magneto-optical recording medium such as an MO (Magneto Optical), which utilizes magnetism in combination with light, and a recording medium of a heat-assisted type which utilizes magnetism in combination with heat.

According to various exemplary embodiments of the present invention, a magnetic recording medium in which a recording layer is formed in a concavo-convex pattern to form recording elements as a convex portion of the concavo-convex pattern and which has a high areal density and high reliability since the occurrence of a head crash of a magnetic head is suppressed can be implemented. In addition, according to various exemplary embodiments of the present invention, a magnetic recording and reproducing apparatus comprising the above magnetic recording medium can be implemented.

DETAILED DESCRIPTION OF THE PREFERRED EMBODIMENT

Various exemplary embodiments of the present invention will be hereinafter described in detail with reference to the drawings.

Figure 1:
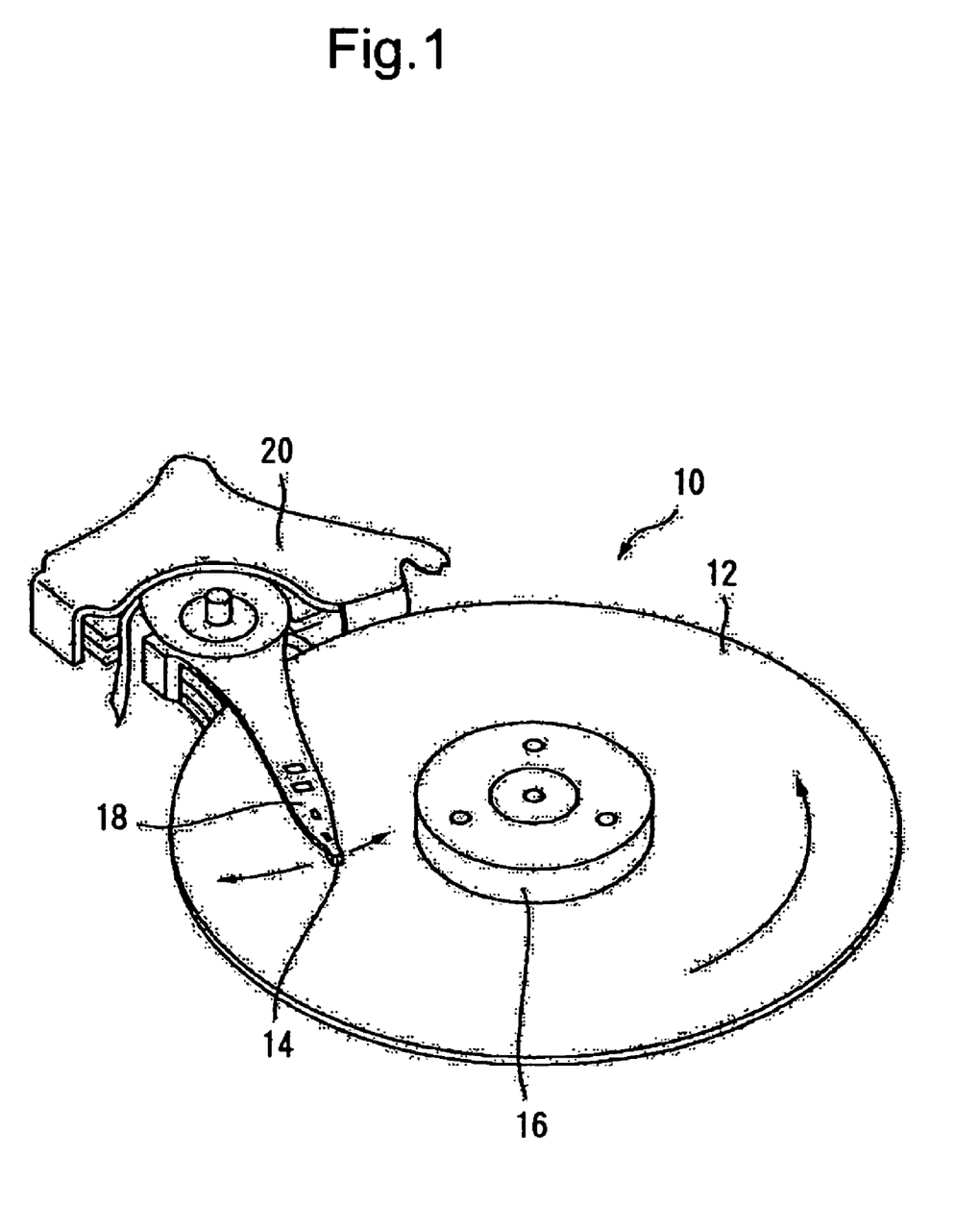
FIG. 1 is a perspective view schematically showing the general configuration of the main parts of a magnetic recording and reproducing apparatus according to a first exemplary embodiment of the present invention.

As shown in FIG. 1, a magnetic recording and reproducing apparatus 10 according to a first exemplary embodiment of the present invention includes a magnetic recording medium 12 and a magnetic head 14 which is provided so as to be flyable in close proximity to the surface of the magnetic recording medium 12 for recording data to or reproducing data from the magnetic recording medium 12. The magnetic recording and reproducing apparatus 10 is characterized by the configuration of the magnetic recording medium 12. The details of the other parts thereof will be omitted since these do not seem necessary for the understanding of the present invention.

The magnetic recording medium 12 is fixedly attached to a chuck 16 and is rotatable together with the chuck 16. The magnetic head 14 is mounted near the tip end of an arm 18, and the arm 18 is rotatably attached to a base 20. In this manner, the magnetic head 14 is movable in a flying manner over the surface of the magnetic recording medium 12 in a circular route along the radial direction of the magnetic recording medium 12.

Figure 2:
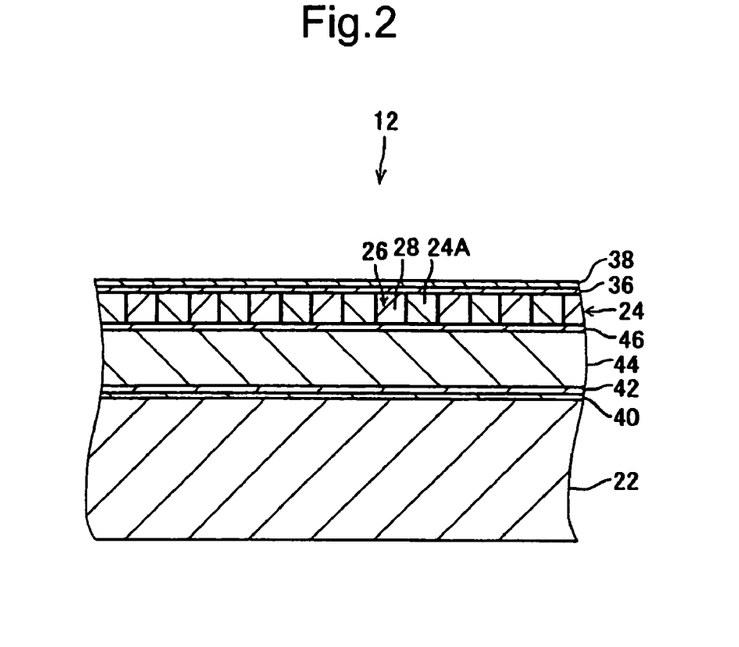
FIG. 2 is a sectional side view schematically showing the configuration of the magnetic recording medium of the magnetic recording and reproducing apparatus.
Figure 3:
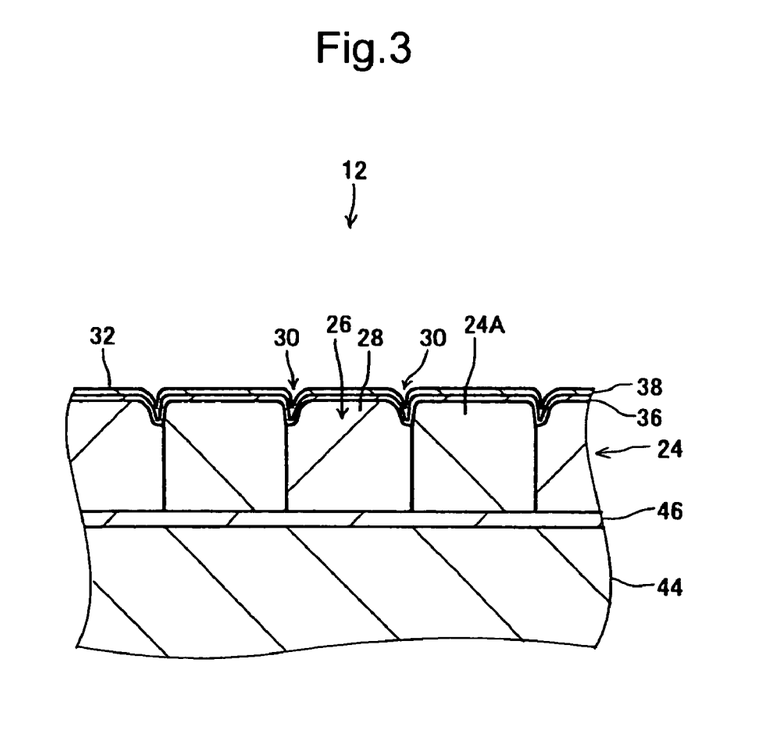
FIG. 3 is an enlarged sectional side view schematically showing the configuration around the filler element of the magnetic recording medium.

The magnetic recording medium 12 is a magnetic disk of a perpendicular recording type and also a discrete track type. As shown in FIG. 2, the magnetic recording medium 12 comprises a recording layer 24 formed over a substrate 22 in a predetermined concavo-convex pattern to form recording elements 24A as a convex portion of the concavo-convex pattern and a non-magnetic filler element 28 filled in a concave portion 26 formed between the recording elements 24A. As shown in enlarged FIG. 3, the filler element 28 is formed such that the top surface thereof is partially recessed toward the substrate 22 side to form grooves 30 having a width smaller than the width of the concave portion 26 on a surface 32. In FIGS. 2 and 3, the recording layer 24 is depicted so that its thickness looks larger in comparison with the other layers than the actual to facilitate understanding. The recording layer 24 is depicted in the same way in FIGS. 4 to 10 and 13 to 18 too.

The surface of substrate 22 on the recording layer 24 side is mirror polished. Examples of the material employed for the substrate 22 include non-magnetic materials such as glass, an NiP-coated Al alloy, Si, and $Al_2O_3$.

The recording layer 24 has a thickness of 5 to 30 nm. Examples of the material employed for the recording layer 24 include a CoCr-based alloy such as a CoCrPt alloy, an FePt-based alloy, a laminate thereof, a material composed of an oxide material such as $SiO_2$ serving as a base and ferromagnetic material particles such as CoPt dispersed into the base in a matrix-like shape, or the like. In a data area, the recording elements 24A are formed in a shape of concentric circular tracks separated by a fine spacing in the radial direction, and FIGS. 2 and 3 illustrate this structure. In a servo area, the recording elements 24A are formed in a shape of a predetermined servo-information pattern (not shown).

Examples of the materials employed for the filler element 28 include oxides such as $SiO_2$, $Al_2O_3$, $TiO_2$, ferrite, nitrides such as AlN, carbides such as SiC, or the like. The top surface of the filler element 28 is recessed toward the substrate 22 side at around the boundaries to the adjacent recording element 24A.

A protective layer 36 and a lubricating layer 38 are formed in this order over the recording element 24A and the filler element 28. The protective layer 36 and the lubricating layer 38 are formed in a shape following the shape of the top surface of the recording element 24A and the filler element 28. The surface 32 is the top surface of the lubricating layer 38, and the groove 30 is formed on the top surface of the lubricating layer 38.

The groove 30 is formed along the boundary between the recording element 24A and the filler element 28, and has a cross-sectional shape widening in the direction away from the substrate 22. The depth of the groove 30 is preferably 0.1 to 4 nm, and the width of the groove 30 is preferably ¼ or less of the width of the concave portion 26.

The protective layer 36 has a thickness of 1 to 5 nm. Examples of the material employed for the protective layer 36 include hard carbon films such as so-called diamond-like carbon. In the present application, the "diamond-like carbon (hereinafter referred to as DLC)" shall refer to a generic term for a material composed of carbon as an essential ingredient, having an amorphous structure, and having a hardness of about $2 \times 10^9$ to $8 \times 10^{10}$ Pa obtained by Vickers hardness measurements. The lubricating layer 38 has a thickness of 1 to 2 nm. Examples of the material employed for the lubricating layer 38 include fluorine containing material such as PFPE (perfluoropolyether).

An underlayer 40, an antiferromagnetic layer 42, a soft magnetic layer 44, and a seed layer 46 for imparting a magnetic anisotropy in the thickness direction (the direction perpendicular to the surface) to the recording layer 24 are formed between the substrate 22 and the recording layer 24. The underlayer 40 has a thickness of 2 to 40 nm. Examples of the material employed for the underlayer 40 include Ta or the like. The antiferromagnetic layer 42 has a thickness of 5 to 50 nm. Examples of the material employed for the antiferromagnetic layer 42 include a PtMn alloy and a RuMn alloy or the like. The soft magnetic layer 44 has a thickness of 50 to 300 nm. Examples of the material employed for the soft magnetic layer 44 include an Fe (iron) alloy, a Co (cobalt) amorphous alloy, ferrite or the like. The soft magnetic layer 44 may have a laminate structure of a layer having soft magnetism and a non-magnetic layer. The seed layer 46 has a thickness of 2 to 40 nm. Specific examples of the material employed for the seed layer 46 include non-magnetic CoCr alloys, Ti, Ru, a laminate of Ru and Ta, MgO or the like.

The operation of the magnetic recording medium 12 will next be described.

Since the grooves 30 are formed on the surface 32 of the magnetic recording medium 12, the magnetic recording medium 12 can be prevented from a crash of the magnetic head 14 caused by stiction thereof while the magnetic gap between the top surface of the recording element 24A and the magnetic head 14 can be kept small.

Since the width of the groove 30 is smaller than the width of the concave portion 26 which is filled with the filler element 28, sufficient air film stiffness between the magnetic head 14 and the magnetic recording medium 12 can be obtained to prevent the variation of the flying height of the magnetic head. In addition, since the groove 30 has a cross-sectional shape widening in the direction away from the substrate 22, the volume of the groove 30 remains small even when the width of the groove 30 at the magnetic head 14 side is widened for preventing stiction of the magnetic head 14. The air film stiffness between the magnetic recording medium 12 and the magnetic head 14 depends on the volume of the groove 30, and thus, also in this respect, the air film stiffness between the magnetic head 14 and the magnetic recording medium 12 is enhanced.

The top surface of the filler element 28 is formed in a shape partially recessed toward the substrate 22 side, and the groove 30 is formed following the recessed shape. In addition, the top surface of the recording element 24A is almost flat and is hardly processed. Therefore, excellent magnetic properties can be achieved.

Also, the top surface of the filler element 28 is formed in a shape partially recessed toward the substrate 22 side, and the groove 30 is formed along the boundary between the recording element 24A and the filler element 28. Therefore, the groove 30 can be easily formed. A method for forming the groove 30 will be described hereinbelow.

Further, the groove 30 is formed along the boundary between the recording element 24A and the filler element 28. That is, the groove 30 is formed along the (relative) traveling direction of the magnetic head 14. Therefore, also in this respect, the flying height of the magnetic head 14 does not tend to fluctuate.

The magnetic recording medium 12 provides the recording element 24A formed in a shape of track in a data area. Therefore, problems such as recording to a track adjacent to the target track, and crosstalk upon reproducing do not tend to occur even when the areal density is high.

In addition, in the magnetic recording medium 12, the recording elements 24A are separated each other by the concave portion 26, and the recording layer 24 is absent in the concave portion 26 between the recording elements 24A. Therefore, noise may not be generated from the concave portion 26, and, in this respect, excellent recording and reproducing properties can be achieved.

In this first exemplary embodiment, the recording element 24A and the filler element 28 each have the same top surface height, and the surface 32 of the magnetic recording medium 12 is flat except for the groove 32. However, as a second exemplary embodiment of the present invention shown in FIG. 4, the top surface of the recording element 24A may be higher than the top surface of the filler element 28, and a step may be provided between the portion of the surface 32 over the recording element 24A and the portion of the surface 32 over the filler element 28. Also, as a third exemplary embodiment of the present invention shown in FIG. 5, the top surface of the filler element 28 may be higher than the top surface of the recording element 24A. In these cases, in order to maintain sufficient air film stiffness between the magnetic head and the magnetic recording medium, the step height between the portion of the surface 32 over the recording element 24A and the portion of the surface 32 over the filler element 28 is preferably 2 nm or less. In addition, in order to keep the magnetic gap between the magnetic head and the recording element 24 small, the top surface of the recording element 24A is preferably higher than the top surface of the filler element 28 as in the second embodiment.

In the first exemplary embodiment, the groove 30 is formed on the surface 32 by forming the top surface of the filler element 28 in a partially recessed shape. However, as a fourth exemplary embodiment of the present invention shown in FIG. 6, the groove 30 may be formed on the surface 32 by forming both the top surface of the recording element 24A and the top surface of the filler element 28 in a shape partially recessed so long as the magnetic properties of the recording element 24A are not deteriorated.

In the first exemplary embodiment, the protective layer 36 and the lubricating layer 38 are formed over the recording element 24A and the filler element 28. However, as a fifth exemplary embodiment of the present invention shown in FIG. 7, a stop film 48 may be deposited on the top surface of the recording element 24A for protecting the recording element 24A from being processed during a manufacturing process. The stop film 48 may remain on the top surface of the recording element 24A. In this case, preferably, the processing is performed such that the step height between the portion of the surface 32 over the recording element 24A (the portion of the surface 32 over the stop film 48) and the portion of the surface 32 over the filler element 28 is in the range of 0 to 2 nm. Also, as a sixth exemplary embodiment of the present invention shown in FIG. 8, the protective layer 36 and the lubricating layer 38 may be omitted to constitute the surface 32 by the top surface of the recording element 24A and the filler element 28.

In the first exemplary embodiment, the groove 30 has a cross-sectional shape widening in the direction away from the substrate 22. However, as a seventh exemplary embodiment of the present invention shown in FIG. 9, the groove 30 may have a cross-sectional shape, for example, with a constant width along the thickness direction.

Figure 11:
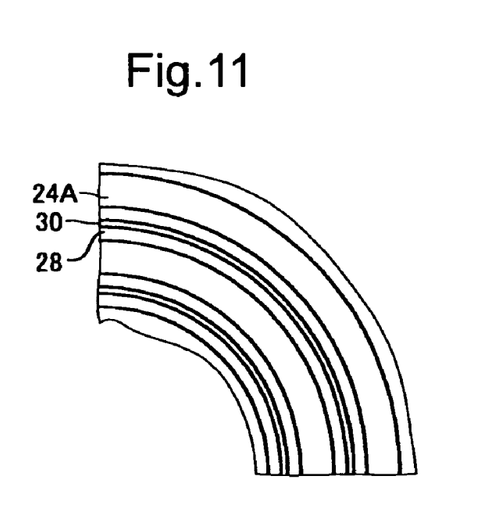
FIG. 11 is a plan view schematically showing the shape of the groove of the magnetic recording medium shown in FIG. 10.
Figure 12:
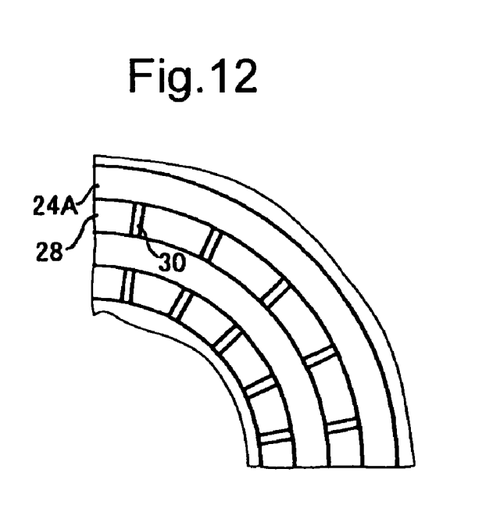
FIG. 12 is a plan view schematically showing the shape of the groove of the magnetic recording medium according to a ninth exemplary embodiment of the present invention.

Also, in the first exemplary embodiment, the groove 30 is formed along the boundary between the recording element 24A and the filler element 28. However, as an eighth exemplary embodiment of the present invention shown in FIGS. 10 and 11, the groove 30 may be formed over the filler element 28 near the center in the width direction. In addition, as a ninth exemplary embodiment of the present invention shown in FIG. 12, the groove 30 may be formed radially over the filler element 28 along the radial direction.

In the first exemplary embodiment, the underlayer 40, the antiferromagnetic layer 42, the soft magnetic layer 44, and the seed layer 46 are formed between the substrate 22 and the recording layer 24. However, the layer configuration between the substrate 22 and the recording layer 24 may be appropriately changed in accordance with requirements and a kind of a magnetic recording medium. Also, the underlayer 40, the antiferromagnetic layer 42, the soft magnetic layer 44, and the seed layer 46 may be omitted to form the recording layer 24 directly on the substrate 22.

In addition, in the first exemplary embodiment, the magnetic recording medium 12 is a magnetic disk of a perpendicular recording type. However, the present invention may be applied to a magnetic disk of a longitudinal recording type.

In the first exemplary embodiment, the magnetic recording medium 12 has the recording layer 24 and other layers formed on one side of the substrate 22. However, the present invention may be applied to a magnetic recording medium having a recording layer formed on both sides of a substrate.

Also, in the first exemplary embodiment, the magnetic recording medium 12 is a magnetic disk of a discrete track type in which the recording elements 24A are arranged side by side in the radial direction with a fine spacing. However, of course, the present invention may be applied to a magnetic disk having recording elements arranged side by side in the circumferential direction (the sector direction) of a track with a fine spacing, a magnetic disk having recording elements arranged side by side in both the radial and circumferential directions of a track with a fine spacing, and a magnetic disk having a spiral-shaped track. The present invention may also be applied to a magneto-optical disc such as an MO disc, a magnetic disk of a heat-assisted type which utilizes magnetism in combination with heat, and other magnetic recording media such as a magnetic tape having a shape other than a disk shape and having a recording layer formed in a concavo-convex pattern.

WORKING EXAMPLES

Nine types of magnetic recording media 12 having the configuration described in the first or second exemplary embodiment were produced. Ten disks were produced for every type. The configuration of the main part of the produced magnetic recording media 12 will next be described.

The substrate 22 has a diameter of approximately 65 nm, and the material for the substrate 22 is glass. The recording layer 24 has a thickness of approximately 20 nm, and the material for the recording layer 24 is a CoCrPt alloy. The material for the filler element 28 is $SiO_2$. The protective layer 36 has a thickness of approximately 2 nm, and the material for the protective layer 36 is DLC. The lubricating layer 38 has a thickness of approximately 1 nm, and the material for the lubricating layer 38 is PFPE.

A specific method for producing these magnetic recording media 12 will next be described briefly. First, the underlayer 40, the antiferromagnetic layer 42, the soft magnetic layer 44, the seed layer 46, a continuous recording layer (the unprocessed recording layer 24), a first mask layer, and a second mask layer were formed in this order over the substrate 22 by means of a sputtering method, and then a resist layer was applied by means of a spin-coat method. The first mask layer has a thickness of approximately 25 nm, and the material for the first mask layer is TaSi. The second mask layer has a thickness of approximately 10 nm, and the material for the second mask layer is Ni. The resist layer has a thickness of approximately 100 nm, and the material for the resist layer is a negative type resist (NEB22A, product of Sumitomo Chemical Co., Ltd.).

A concavo-convex pattern corresponding to a servo pattern of the servo area and a concavo-convex pattern corresponding to a track pattern of the data area were transferred on the resist layer by means of a nano-imprinting method using a transfer apparatus (not shown), and the resist layer was processed by means of reactive ion beam etching using $O_2$ gas to remove its bottom parts of the concave portions. Subsequently, the second mask layer was processed by means of ion beam etching using Ar gas to remove its bottom parts of the concave portions, and the first mask layer was processed by means of reactive ion etching using $SF_6$ gas serving as a reactive gas to remove its bottom parts of the concave portions. Subsequently, the continuous recording layer was processed by means of reactive ion etching using CO gas and $NH_3$ gas serving as a reactive gas to remove its bottom parts of the concave portions. Thus, the continuous recording layer was divided into a plurality of the recording elements 24A, and the recording layer 24 having a concavo-convex pattern had been formed. The processing was performed so as to obtain a track pitch of the data area (the pitch between the recording elements 24A in the track width direction) of approximately 200 nm and a width of the top surface of the recording layer 24A (the track width) of approximately 100 nm. In addition, the first mask layer remaining on the recording layer 24A was completely removed by means of reactive ion etching using $SF_6$ gas serving as a reactive gas.

Figure 13:
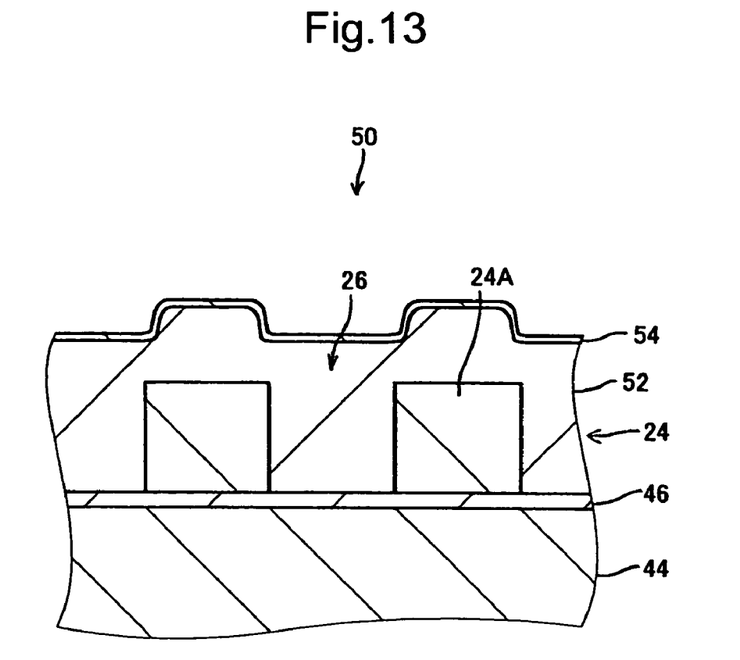
FIG. 13 is a sectional side view schematically showing a state in which the filler material and the coating material were deposited over the surface of an object to be processed, during the manufacture process of the magnetic recording medium according Working Examples of the present invention.

Next, as shown in FIG. 13, a filler material 52 (the material for the filler element 28) was deposited on the surface of an object to be processed 50 in a thickness of approximately 30 nm (the thickness on the recording element 24A) by means of a bias sputtering method. In this process, a deposition power (the power applied to a target) of approximately 500 W, a vacuum chamber pressure of approximately 0.3 Pa, a bias power applied to the object 50 of approximately 250 W were employed. The filler material 52 was deposited on the object to be processed 50 and formed in a shape following the concavo-convex pattern of the recording layer 24 so as to cover the recording element 24A with the projections and depressions smoothed to some extent. Thus, the concave portion 26 was filled with the filler material 52. The convex portion of the filler material 52 was formed such that the side edge portions thereof were positioned within the edges of the top surface of the recording element 24A.

Further, a coating material 54 was deposited on the filler material 52 in a thickness of approximately 10 nm by means of a sputtering method. In this process, a deposition power of approximately 500 W and a vacuum chamber pressure of approximately 0.3 Pa were employed. Pt (platinum) having an etching rate for ion beam etching lower than that of $SiO_2$ was employed as a coating material, but Cr or Zn may be employed in place of Pt. Since the side edge portions of the convex portion of the filler material 52 were positioned within the edges of the top surface of the recording element 24A, the convex portion of the coating material 54 was formed such that the side edge portions thereof was positioned near the edges of the top surface of the recording element 24A. In FIG. 13, the concavo-convex shape is exaggerated as compared to the actual shape to facilitate understanding of the Working Example of the present invention. The deposition thickness of the coating material 54 for each of the nine types of the objects to be processed 50 is listed in Table 1. The deposition thickness of the coating material 54 listed in Table 1 is the average of ten objects to be processed 50.

Figure 14:
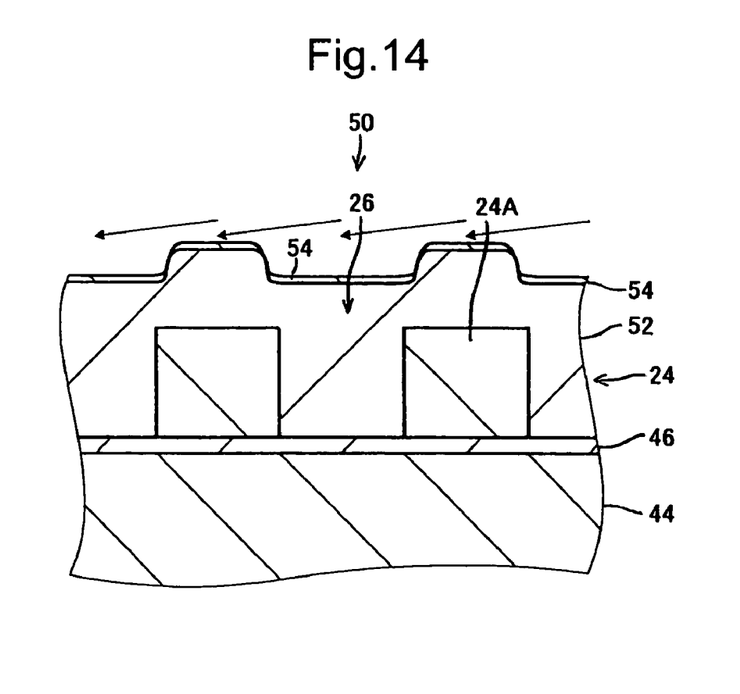
FIG. 14 is a sectional side view schematically showing a state in which the coating material had been removed in the side edge of the convex portion by flattening.

Next, the coating material 52 and the filler material 54 over the surface of the object to be processed 50 were removed for flattening by means of ion beam etching using Ar gas while rotating the object to be processed 50 as shown in FIG. 14. In this process, the top surface of the recording element 24A and the top surface of the filler element 28 for nine types of the object to be processed 50 were processed to form into different shapes by adjusting the etching time. The etching time employed for each of them is listed in Table 1.

rate against ion beam etching compared with the filler material 52 before depositing the filler material 52.

Next, the DLC protective layer 36 having a thickness of approximately 2 nm was formed on the top surface of the recording element 24A and the filler element 28 by means of a CVD method, and the PFPE lubricating layer 38 was applied on the protective layer 36 in a thickness of 1 to 2 nm by means of a dipping method. The protective layer 36 and the lubricating layer 38 were deposited over the top surface of the

TABLE 1

| Type | Width of groove (nm) | Depth of groove (nm) | Deposition thickness of coating material (nm) | Processing time for flattening (SEC) | Step height between recording element and filler element (nm) | Number of crashed disks | Variation of flying height (nm) |
|---|---|---|---|---|---|---|---|
| Working Example | | | | | | | |
| A | 15 | 0.1 | 10.0 | 165 | 0.0 | 0 | 2 |
| B | 15 | 0.8 | 10.2 | 166 | 0.0 | 0 | 2 |
| C | 15 | 2.0 | 10.5 | 168 | 0.0 | 0 | 2 |
| D | 15 | 4.0 | 11.0 | 171 | 0.0 | 0 | 2 |
| E | 15 | 6.0 | 11.5 | 174 | 0.0 | 0 | 4 |
| F | 15 | 4.0 | 10.9 | 172 | 0.3 | 0 | 2 |
| G | 15 | 4.0 | 10.7 | 174 | 1.0 | 0 | 2 |
| H | 15 | 4.0 | 10.4 | 177 | 2.0 | 0 | 2 |
| J | 15 | 4.0 | 10.1 | 180 | 3.0 | 2 | 6 |
| Comparative Example | — | 0.0 | — | — | 0.0 | 6 | 2 |

The incident angle of the Ar gas was set to 2° with respect to the surface of the object to be processed 50. By tilting the incident direction of the Ar gas with respect to the direction perpendicular to the surface of the object to be processed 50, the etching rate of the edge of the convex portion becomes significantly higher than the etching rate of the concave portion. Therefore, as shown in FIG. 14, the coating material 54 coating the edge of the convex portion was removed at a faster rate than the coating material 54 coating the concave portion. As a result, the filler material 52 in the edge of the convex portion over the recording element 24A was exposed from the coating material 54.

Figure 15:
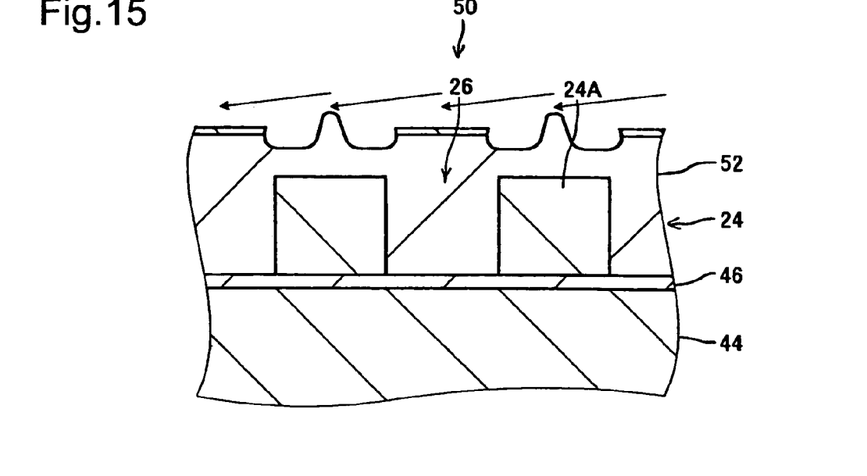
FIG. 15 is a sectional side view schematically showing a state in which the filler material in the edge of the convex portion had been etched deeper than the other portions.
Figure 16:
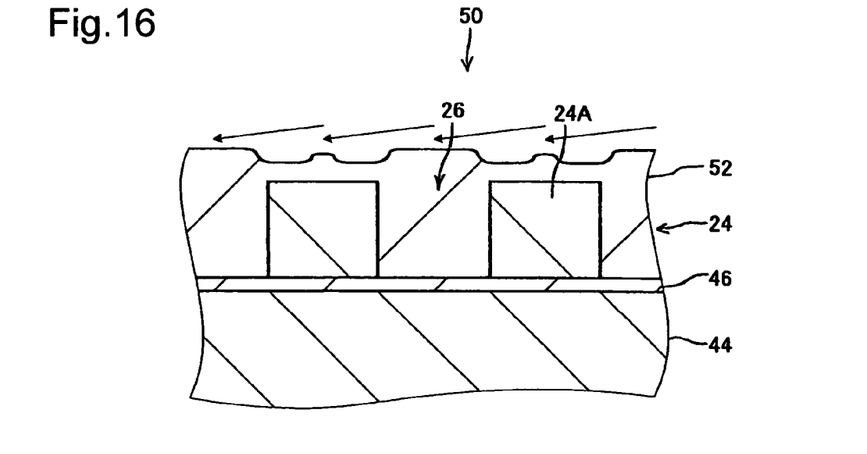
FIG. 16 is a sectional side view schematically showing a state in which the concavo-convex pattern of the filler material at the deposition time had been reversed.
Figure 17:
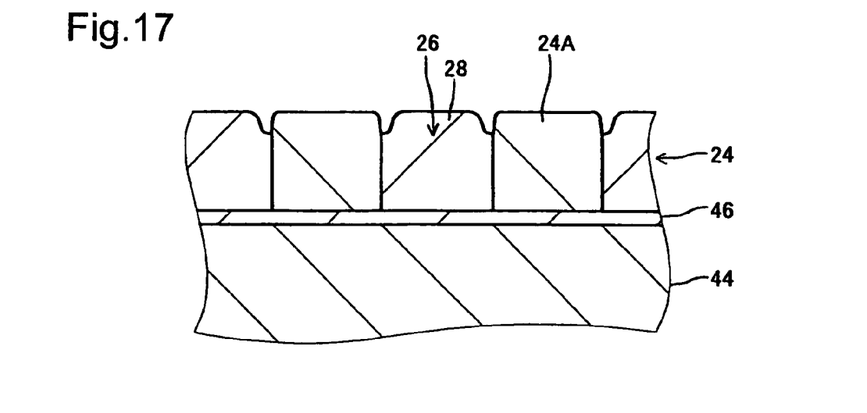
FIG. 17 is a sectional side view schematically showing a state in which the filler material had been etched into a shape having the recessed edges on the top surface.

As the etching proceeded, the portion of the filler material 52 which was exposed from the coating material 54 (the edge of the convex portion) was removed at a faster rate than the other portions as shown in FIG. 15. Therefore, the portion of the filler material 52 over the recording element 24A was removed at a faster rate than the portion of the filler material 52 over the concave portion 26. As a result, the concavo-convex pattern at the deposition time was reversed as shown in FIG. 16. Also, the width of the concave portion of the filler material 52 became slightly larger than the width of the top surface of the recording element 24A. After the coating material 54 was completely removed, the filler material 52 was removed uniformly. However, since the etching rate of the recording element 24A is slower than the etching rate of the filler material 52, the etching near the edge of the concave portion 26 proceeds at the fastest rate. As a result, the top surface of the filler element 28 was formed into a shape having the edges recessed toward the substrate 22 side as shown in FIG. 17.

Figure 4:
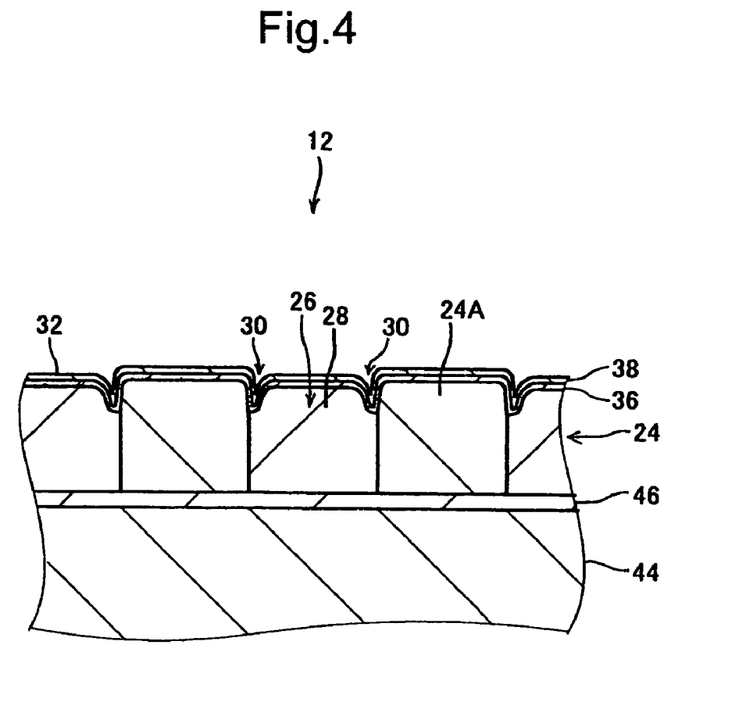
FIG. 4 is an enlarged sectional side view schematically showing the configuration around the filler element of the magnetic recording medium according to a second exemplary embodiment of the present invention.
Figure 5:
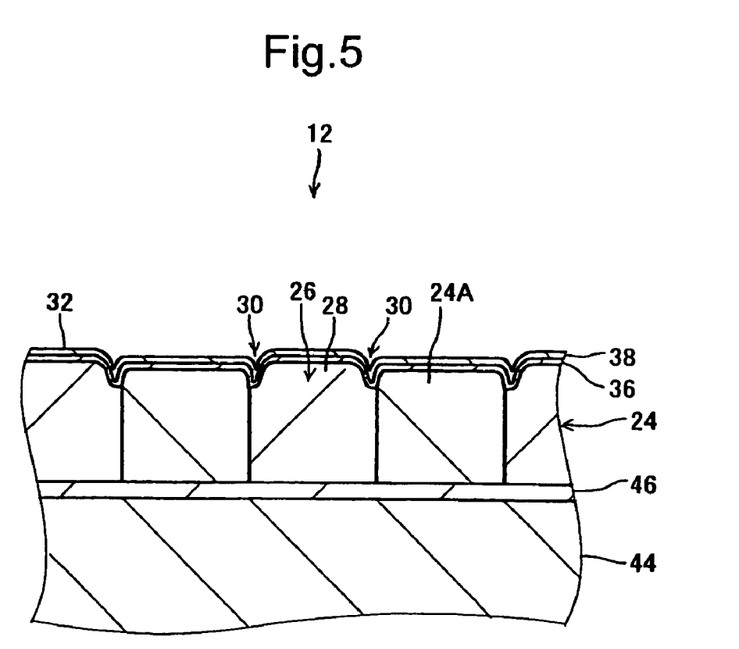
FIG. 5 is an enlarged sectional side view schematically showing the configuration around the filler element of the magnetic recording medium according to a third exemplary embodiment of the present invention.
Figure 6:
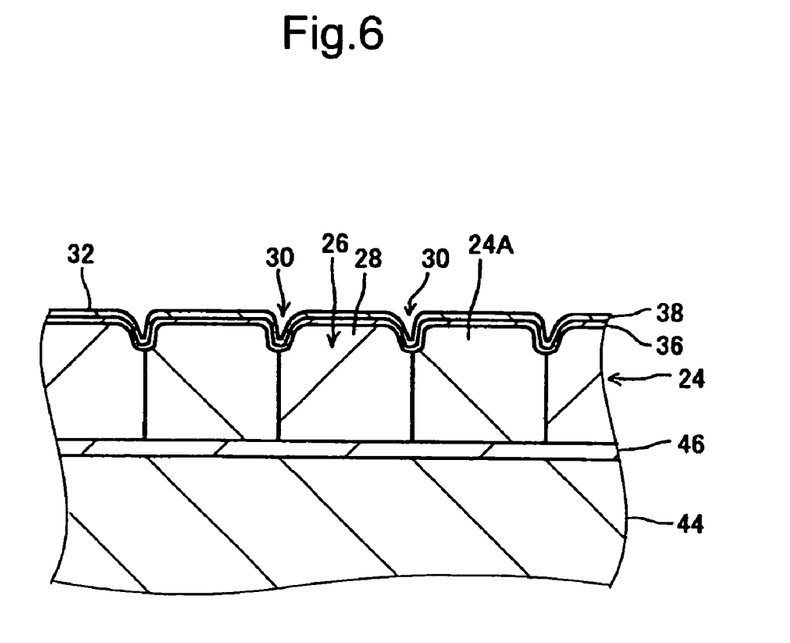
FIG. 6 is an enlarged sectional side view schematically showing the configuration around the filler element of the magnetic recording medium according to a fourth exemplary embodiment of the present invention.
Figure 7:
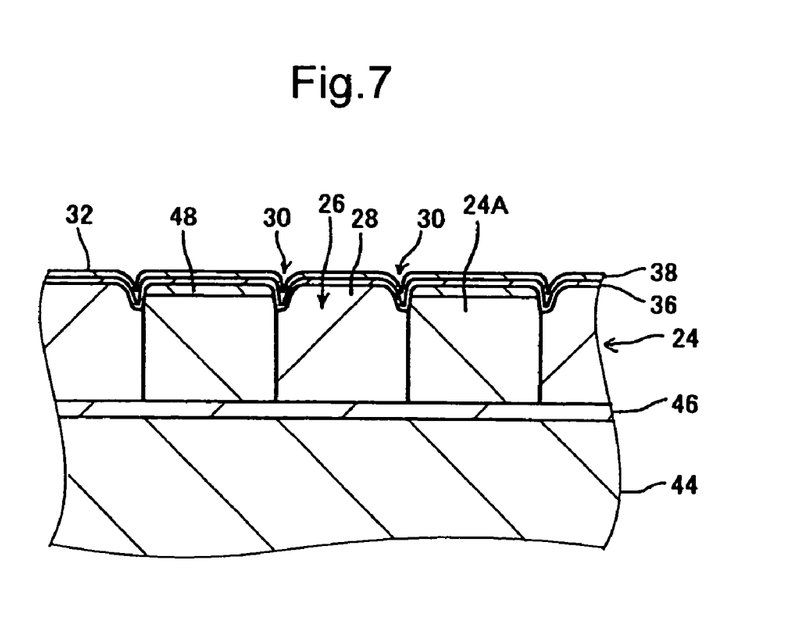
FIG. 7 is an enlarged sectional side view schematically showing the configuration around the filler element of the magnetic recording medium according to a fifth exemplary embodiment of the present invention.
Figure 8:
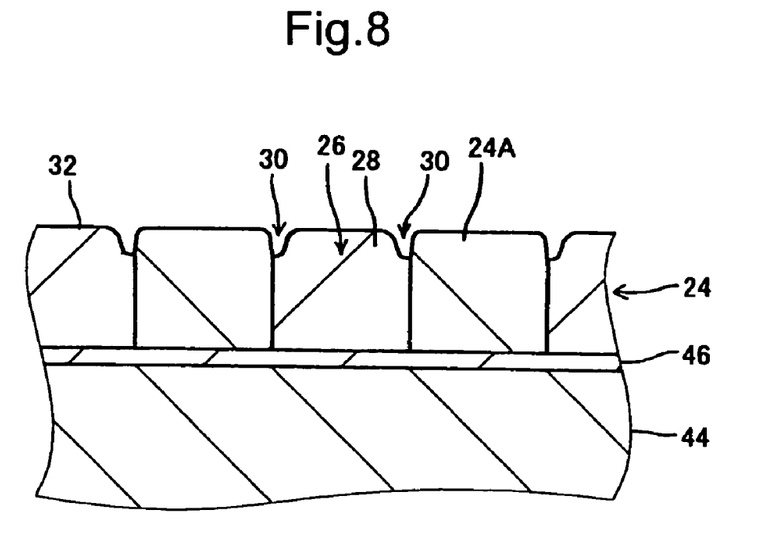
FIG. 8 is an enlarged sectional side view schematically showing the configuration around the filler element of the magnetic recording medium according to a sixth exemplary embodiment of the present invention.
Figure 9:
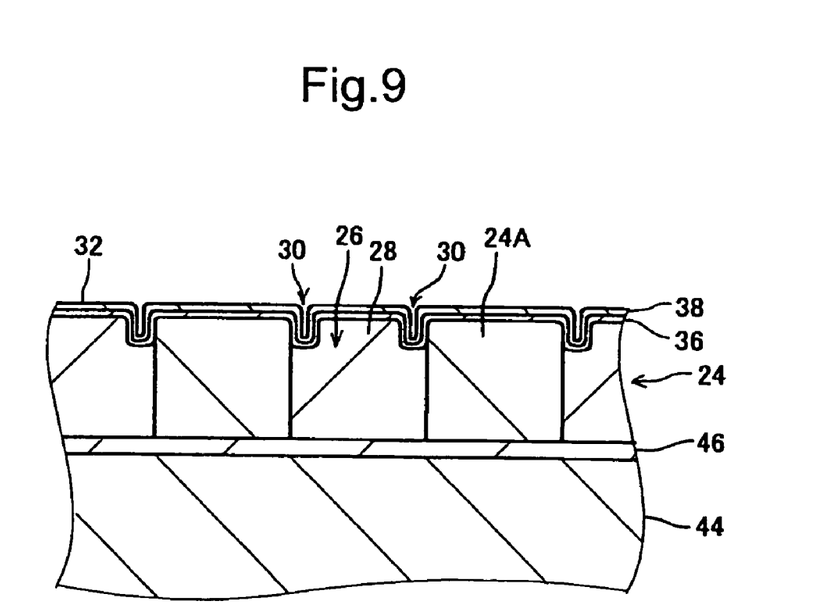
FIG. 9 is an enlarged sectional side view schematically showing the configuration around the filler element of the magnetic recording medium according to a seventh exemplary embodiment of the present invention.
Figure 10:
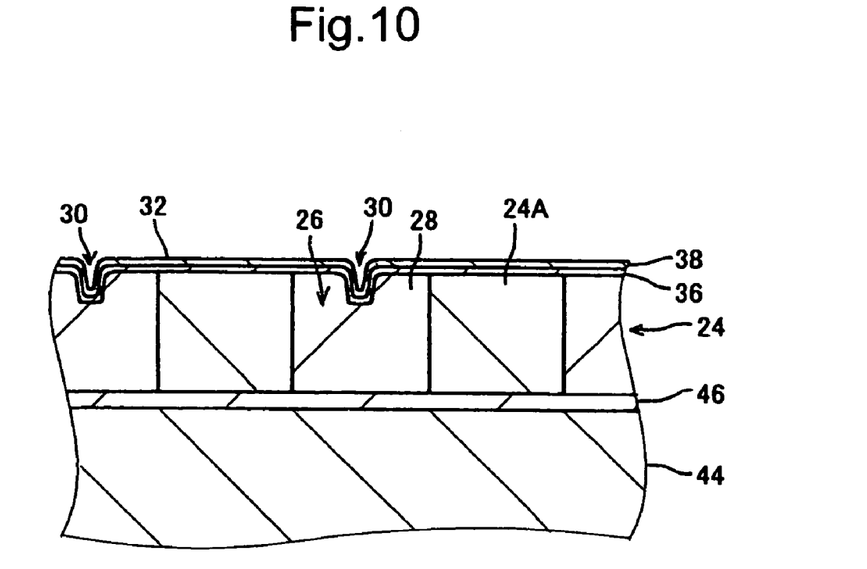
FIG. 10 is an enlarged sectional side view schematically showing the configuration around the filler element of the magnetic recording medium according to an eighth exemplary embodiment of the present invention.

In this process, the top surface of the recording element 24A could be slightly processed near the edge. However, since the etching rate of the recording element 24A was low, the other portion was protected from the processing and the flat shape was maintained. The top surface of the recording element 24A may be reliably protected from processing by depositing, on the top surface of the recording element 24A, a stop film (for example, a DLC film) having a lower etching recording element 24A and the filler element 28 so as to follow the shape of the top surface of the recording element 24A and the filler element 28, resulting in the formation of the groove 30 on the surface 32 along the boundary between the recording element 24A and the filler element 28 as shown in FIG. 3 or 4.

The thus-obtained nine types of the magnetic recording media 12 were measured for the width and depth of the groove 30, and the step height between the portion of the surface 32 over the recording element 24A and the portion of the surface 32 over the filler element 28, and the results are shown in Table 1. The values listed in Table 1 are the average of the 10 disks of the magnetic recording medium 12 for each type. The value of the step height of each of the types F to J indicates that the portion of the surface 32 over the recording element 24A is higher than the portion of the surface 32 over the filler element 28 by the value of the step height.

A seek test of the magnetic head 14 was performed on the nine types of the magnetic recording media 12 in the region located at 18 to 20 mm from the center in the radial direction and having a width of 2 mm for 100,000 times. A suspension load was adjusted so as to fly the magnetic head 14 at a flying height of 10 nm. The average seek time was set to 12 ms. And a variation of the flying height of the magnetic head 14 was measured by means of an LDV (Laser Doppler Vibrometer). After the seek test, the magnetic head 14 was inspected for flaws caused by a crash. The inspection results are also shown in Table 1. The inspection results of the crash flaws are represented by the number of the magnetic recording medium which caused the crash flaws on the magnetic head. A variation of the flying height of the magnetic head 14 listed in Table 1 is the average of ten magnetic recording media 12 for each type.

COMPARATIVE EXAMPLE

In contrast to the above Examples, ten substrates having a mirror polished surface were prepared. The protective layer 36 and the lubricating layer 38 were formed over the substrates as in the above Working Examples. These substrates were subjected to a seek test of the magnetic head 14 for 100,000 times. The conditions of the seek test were the same as in the above Working Examples. And a variation of the flying height of the magnetic head 14 was measured, and the magnetic head 14 was inspected for crash flaws after the seek test. The measurement results are also shown in Table 1.

As shown in Table 1, the occurrence of crash was found in six out of ten substrates of the Comparative Example. On the other hand, the occurrence of crash was found only in two out of ten media of one type of the magnetic recording media of the above Working Examples, and occurrence of crash was not found in the other eight types of the magnetic recording media 12 of the above Working Examples. Therefore, a significant reduction in the occurrence of the crash was confirmed in the above Working Examples as compared with the Comparative Example. Since the substrate of the Comparative Example is mirror polished, the crash caused by the stiction of the magnetic head tends to occur. On the other hand, in the above Working Examples, the crash caused by the stiction of the magnetic head may be prevented since the groove 30 is formed on the surface 32 of the magnetic recording media 12.

The crash was not found to occur in eight types (A to H) of the magnetic recording media of the above Working Examples, and these types of the magnetic recording media have a step height between the portion of the surface 32 over the recording element 24A and the portion of the surface 32 over the filler element 28 of 0 to 2 nm. On the other hand, the crash was found to occur in the type J of the magnetic recording medium 12. The type J has the step height between the portion of the surface 32 over the recording element 24A and the portion of the surface 32 over the filler element 28 of 3 nm. The crash on the type J of the magnetic recording medium 12 may be caused due, not to the stiction of the magnetic head, but to the variation of the flying height of the magnetic head 14. As can be seen from Table 1, the crash caused by the variation of the flying height of the magnetic head can be reliably prevented if the step height between the portion of the surface 32 over the recording element 24A and the portion of the surface 32 over the filler element 28 is in the range of 0 to 2 nm.

In the case of a hard disk, a variation of the flying height of a magnetic head should be 3 nm or less in order to achieve excellent recording and reproducing characteristics. As shown in Table 1, the step height between the portion of the surface 32 over the recording element 24A and the portion of the surface 32 over the filler element 28 is zero for the type A to the type E. Of these, the type E has a depth of the groove 30 of 6 nm, and a variation of the flying height of the magnetic head exceeded 3 nm only in the type E. The type A to the type D have a depth of the groove 30 of 4 nm or less, and a variation of the flying height of the magnetic head was 3 nm or less in all cases. Therefore, when the step height between the portion of the surface 32 over the recording element 24A and the portion of the surface 32 over the filler element 28 is zero, a variation of the flying height of the magnetic head can be reliably suppressed to 3 nm or less by maintaining the depth of the groove 30 in the range of 0.1 to 4 nm.

The type F to the type J have a depth of the groove 30 of 4 nm. Of these, the type J has a step height between the portion of the surface 32 over the recording element 24A and the portion of the surface 32 over the filler element 28 of 3 nm, and a variation of the flying height of the magnetic head exceeded 3 nm only in the type J. The type F to the type H have a step height between the portion of the surface 32 over the recording element 24A and the portion of the surface 32 over the filler element 28 of 2 nm or less, and a variation of the flying height of the magnetic head was 3 nm or less in all these types. Therefore, when a step is present between the portion of the surface 32 over the recording element 24A and the portion of the surface 32 over the filler element 28, and if the depth of the groove 30 is restricted to 4 nm or less, a variation of the flying height of the magnetic head can be reliably suppressed to 3 nm or less by restricting the step height in the range of 0 to 2 nm.

The present invention may be employed in a magnetic recording medium in which a recording layer is formed in a predetermined concavo-convex pattern such as a discrete track medium or a patterned medium.

What is claimed is:

1. A magnetic recording medium comprising:
   a recording layer formed over a substrate in a predetermined concavo-convex pattern to form recording elements each being a convex portion of the concavo-convex pattern; and
   a non-magnetic filler element filled in a concave portion of the concavo-convex pattern, wherein
   the filler element has a top surface with an edge portion along a boundary between the filler element and an adjacent recording element, the edge portion being recessed toward the substrate side to form a groove having a width smaller than a width of the concave portion where the magnetic recording medium is a part of a recording disk.

2. The magnetic recording medium according to claim 1, wherein
   the groove has a cross-sectional shape widening in a direction away from the substrate.

3. The magnetic recording medium according to claim 1, wherein the groove has a depth of 0.1 to 4 nm.

4. The magnetic recording medium according to claim 2, wherein the groove has a depth of 0.1 to 4 nm.

5. The magnetic recording medium according to claim 1, wherein
   a step height between a portion of the surface over the recording element and a portion of the surface over the filler element is in a range of 0 to 2 nm.

6. The magnetic recording medium according to claim 2, wherein
   a step height between a portion of the surface over the recording element and a portion of the surface over the filler element is in a range of 0 to 2 nm.

7. The magnetic recording medium according to claim 3, wherein
   a step height between a portion of the surface over the recording element and a portion of the surface over the filler element is in a range of 0 to 2 nm.

8. A magnetic recording and reproducing apparatus comprising:
   the magnetic recording medium according to claim 1; and
   a magnetic head.

9. A magnetic recording and reproducing apparatus comprising:
   the magnetic recording medium according to claim 2; and
   a magnetic head.

10. A magnetic recording and reproducing apparatus comprising:
    the magnetic recording medium according to claim 3; and
    a magnetic head.

11. A magnetic recording and reproducing apparatus comprising:
    the magnetic recording medium according to claim 5; and
    a magnetic head.

* * * * *